Jan. 15, 1935.  C. G. VEINOTT  1,987,725
THERMAL MOTOR PROTECTIVE DEVICE
Filed Oct. 6, 1933
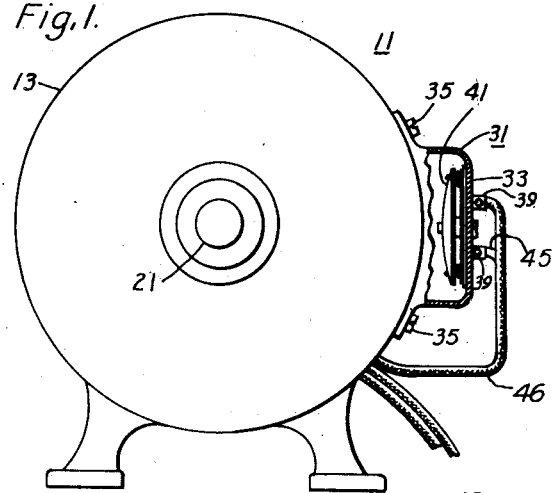
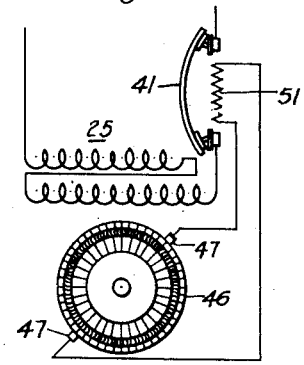
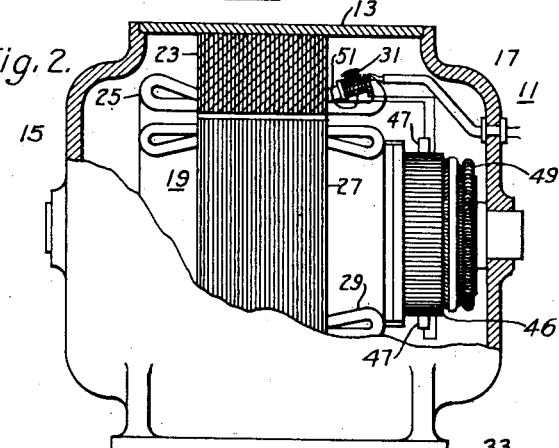
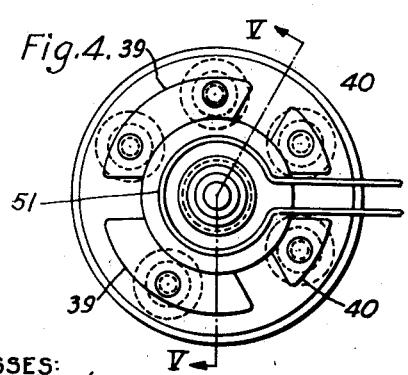
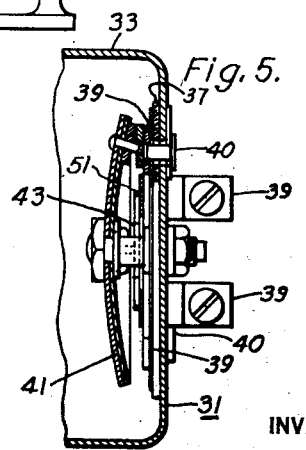
WITNESSES:
INVENTOR
Cyril G. Veinott
BY
ATTORNEY Patented Jan. 15, 1935

1,987,725

UNITED STATES PATENT OFFICE 1,987,725

THERMAL MOTOR PROTECTIVE DEVICE

Cyril G. Veinott, Springfield, Mass., assignor to Westinghouse Electric & Manufacturing Company, East Pittsburgh, Pa., a corporation of Pennsylvania Application October 6, 1933, Serial No. 692,509

9 Claims. (Cl. 172—279)

My invention relates to protective devices and more particularly to thermal protective devices to be used with electric motors.

One object of my invention is to provide a relatively simple and efficient device for protecting an electric motor not only during the starting period but also during the running period.

Another object of my invention is to provide a protective device for a repulsion induction motor that shall be operated during the starting period in accordance with the rotor current and that shall be operated during running periods in accordance with the heating effect of the stator current.

Other objects will either be pointed out hereinafter or will be apparent from the drawing.

In practicing my invention, I provide a thermostatic switch assembly which is mounted on the casing of an electric motor, particularly of the repulsion induction motor type, the assembly being provided with a small auxiliary heater connected in circuit across the brushes of the rotor.

In the single set of drawings,

Figure 1 is a view in end elevation of a repulsion-induction type motor with which is associated the device embodying my invention, Fig. 2 is a view in longitudinal section through a motor of the general type shown in Figure 1, the thermal protective device, however, being directly mounted on the stator windings, Fig. 3 is a schematic diagram of connections of a system which I may utilize, Fig. 4 is a top plan view of a thermostatic switch assembly which I may use, the bimetal disc and the casing not being shown, and Fig. 5 is a sectional view through an assembled thermostatic switch, taken on the line V—V of Fig. 4.

I have illustrated in Figure 1 of the drawing, a repulsion induction motor 11 which is to be understood as including a housing 13 and bearing brackets 15 and 17, as well as a rotor structure 19 which is indicated generally only by the rotor shaft 21. The stator assembly is to be understood as including laminations 23 and a two part stator winding 25 while the rotor structure includes the usual laminated core 27 and a rotor winding 29 and as substantially the same parts are shown in Figure 2 of the drawing, these parts are provided with the same designations in Figures 1 and 2.

Operatively associated with the housing of assembly 11 is a thermal switch assembly 31 shown more in detail in Figs. 4 and 5 of the drawing from which it will be noted that the assembly includes a dished housing 33 which is of such shape at its inner face as to fit closely against the outer peripheral surface of the stator casing, and is adapted to be held thereagainst by a plurality of small machine screws 35.

Against the inner face of dished member 33 there is located an insulating plate 37 which may be of mica and against the outer face of which are secured a plurality of fixed contact members 39 which may be held in proper operative and fixed position by any suitable means such as rivets or studs as shown in Fig. 5 of the drawing. A pair of contact terminals 40 are also provided, having studs extending through the dished member 33, the mica disc 37 and an outside mica disc to permit of connecting conductors thereto.

A thermally actuable element 41 is provided and is in the form of a dished bimetal disk which is of the kind disclosed and claimed in Patent No. 1,448,240 to J. A. Spencer. This disk has the characteristic of remaining in one of its two limiting positions, such as that shown in Fig. 5 of the drawing until a predetermined temperature change occurs therein, when it moves with a snap action to its second and opposed limiting position in which the disk is dished in the opposite direction. A plurality of insulatedly mounted contact bridging members 43 are mounted on the disk 41, these movable contact members cooperating with the fixed contact members 39 and 40 to suitably control the electric circuit of stator winding 25, a plurality of electric conductors or leads 45 being provided to make proper connection with the fixed contact members to properly control the energizing circuit of the motor.

Referring now more particularly to Fig. 2 of the drawing, I have there illustrated the thermal protective device 31 as being mounted in direct heat-exchanging relation with stator winding 25 but in all other respects, it is of substantially the same construction and operation as hereinbefore set forth.

I have indicated that the rotor 19 is provided with a commutator 46, a pair of brushes 47 and a centrifugally-actuated commutator short-circuiting device 49 which is shown schematically or generally only in the drawing, as it forms no part of my invention and may be of any conventional construction already known in the art.

Referring to Figure 3 of the drawing, I have there illustrated the connections of a circuit electrically connected to the brushes 47 engaging commutator 46 and it will be noted that I provide a relatively small auxiliary heating element 51, which heating element is mounted in any suitable or desired manner between the disk 41 and the dished member 33, as shown in Fig. 5 of the drawing.

The operation of the device and system embodying my invention when applied to a repulsion induction motor may be described as follows. At low operating speeds of rotor 19, the commutator short-circuiting device 49 will be inoperative. That is, that part thereof adapted to engage the commutator segments and short circuit them will be out of engagement therewith and the motor will, when connected to an alternating-current source of electric energy, operate as a repulsion motor, current therefore flowing in the circuit between the brushes and traversing the auxiliary heating element 51. If now the motor be subjected to a very large starting overload or if in an extreme case the load be so large that the motor is stalled, a relatively large current will flow in the rotor winding 29 and also in the auxiliary heater 51, thereby raising the temperature of disk 41 and finally causing it to move to a circuit interrupting position and, as the cooperating contact members of device 31 are connected in circuit with the energizing winding of the motor, the motor will be deenergized upon snap acting movement of disk 41 to its opposed position. It will be noted that the heat generated by resistor 51 is substantially directly proportional to the copper loss in the armature winding.

If on the other hand the starting operation is effected in a normal manner, that is, if the motor comes up to speed in a normal manner and normal time, the short-circuiting device 49 will operate at some predetermined speed below full operating speed to short-circuit the commutator, whereby auxiliary heating element 51 is also short-circuited or deenergized or rendered inoperative, and it will no longer serve to cause an increase in the temperature of disk 41. Referring particularly to the assembly shown in Fig. 1 of the drawing, it is to be noted that the thermal protective device 31 will still be operative to protect the motor from excessive or long continued over-loads during running conditions because of the fact that the heat generated not only in the stator laminations but also in the stator winding will flow outwardly through the laminations and through the housing of the motor and, thereby raise the temperature of disk 41 so that upon proper design construction and correlation of the thermal switch and the motor, the thermal switch will operate at a predetermined permissable maximum temperature of the motor and particularly of the stator winding to thereby deenergize the motor. It may be noted, also, that the centrifugally-actuated device 49 makes ineffective the control of the thermal switch by the rotor at a predetermined speed.

It is obvious that the heating effect of the losses in the stator structure during starting depend upon the relative proportion of the starting time to the running time. Thus if a motor is started infrequently, say once a day, the heating effect of the stator losses during starting is negligible. Where the operating cycle of the motor is such that it is started very frequently, say every few minutes, and shut down after a few seconds running, the heating effect of the stator structure during the starting periods will be quite large, but the results thereof do not affect the thermal switch so quickly as does the heating element connected in series circuit with the rotor winding.

I have shown, in Fig. 3 of the drawing, the stator winding 25 as including two sections or parts to permit of operating the motor on either one of two different supply circuit voltages. When the two sections are connected in series with each other, the motor may, for example, be operated on a 220 volt circuit while it is only necessary to connect the sections of the energizing winding 25 in parallel to admit of operating the motor on 110 volts. It is obvious also that the value of the current in the armature circuit and in the resistor 51 will be substantially the same under both conditions of operation and that the thermal device will also operate properly to protect the motor irrespective of the voltage of the supply circuit to which it may be connected.

Referring to Fig. 2 of the drawing where the thermal switch 31 is shown as being in direct heat-receiving relation with the stator winding 25, the same general results upon operating the motor under overload conditions will be obtained as was above described in connection with the assembly of Figure 1. There is this difference, however, that it is not necessary that the heat generated in stator winding 25 flow through the stator laminations and the housing but it is necessary only that it traverse the electric insulating material provided on the copper of the stator winding 25 after which it will be available to cause a rise in the temperature of disk 41.

The device embodying my invention is, therefore, effective to protect a repulsion induction motor not only during the starting period but also during the running period. This operation is effected by controlling the thermal switch in direct accordance with abnormal rotor circuit current during starting and in direct accordance with abnormal stator circuit current during runnig. In each case, the thermally actuable switch is controlled by the heating effect of the respective stator and rotor currents.

Various modifications may be made in the device embodying my invention without departing from the spirit and scope thereof, and I desire, therefore, that only such limitations shall be placed thereon as are imposed by the prior art or are set forth in the appended claims.

I claim as my invention:

1. A protective device in combination with a repulsion-induction motor having a stator winding and a rotor winding, said device including circuit-controlling contact members in the stator winding circuit, a thermally-actuable member controlling said contact members and directly affected by the temperature of the stator winding, means for heating said thermally-actuable member in direct accordance with the starting current in the rotor winding, and automatic means rendering said heating means ineffective at a predetermined motor speed.

2. A protective device in combination with a repulsion-induction motor having a stator winding and a rotor winding and means to short circuit the rotor winding at normal motor speed, said device including a thermal switch in heat-receiving relation to the stator winding and a heating element connected in the rotor winding circuit and located in heat-transferring relation to the thermal switch.

3. A thermal protective device in combination with a repulsion-induction motor having a stator winding and a rotor winding, said device including a switch in the circuit of the stator winding, a thermal element in heat-receiving relation to the stator winding for effecting opening of the switch in case of excessive overload on the motor during running conditions, a heating element in heat-transferring relation to the thermal element and traversed by the current in the rotor winding during starting to effect opening of the switch in case of abnormal starting conditions, and motor driven means rendering the heating means ineffective at a predetermined motor speed.

4. A thermal protective device in combination with a repulsion-induction motor having a stator and a stator winding and a rotor winding, said device including a thermally-actuable switch in the stator winding circuit having means for controlling it by the heating effect of the stator current and the rotor current during starting and by the heating effect of the stator current alone during running.

5. A thermal protective device in combination with a repulsion-induction motor having a stator and a stator winding, a rotor winding and centrifugally actuable rotor winding short circuiting means, said device including a thermally-actuable switch in the stator winding circuit and in heat-receiving relation with the stator and stator winding and having means for effecting opening of the switch in accordance with the losses in the stator assembly and in the rotor winding during starting of the motor and in accordance with the losses in the stator and in the stator winding during running of the motor.

6. A thermal protective device in combination with a repulsion-induction motor including a stator structure having stator laminations and a stator winding and a rotor structure having rotor laminations and a rotor winding and centrifugally actuable rotor winding short circuiting means, said device comprising a thermal switch controlling the stator circuit and including means for actuating the switch in direct accordance with the combined copper loss in one of said structures and the iron and copper loss in the other structure during starting conditions and in direct accordance with the combined copper and iron loss in the other of said structures during running conditions.

7. A thermal protective device in combination with a repulsion-induction motor including a stator structure having stator laminations and a stator winding, a rotor structure having rotor laminations and a rotor winding and centrifugally actuable rotor winding short circuiting means, said device comprising a thermal switch controlling the stator circuit located in heat-receiving relation to the stator structure and controlled in direct accordance with abnormal rotor and stator circuit current during starting and in direct accordance with abnormal stator circuit current during running.

8. A device as set forth in claim 4 in which said controlling means includes a centrifugally-actuable means to make ineffective the heating effect of the rotor current during running.

9. A thermal protective device for a repulsion-induction motor having a stator and a stator winding and a rotor structure including a rotor winding a commutator therefor and a centrifugally-actuated commutator short-circuiting means, said protective device including a thermal switch controlling the circuit of the stator winding and a heating coil in heat-transferring relation to the thermal switch and traversed by the rotor winding current during initial starting operation, said commutator short circuiting means being effective at a certain rotor speed to render the heating coil inactive.

CYRIL G. VEINOTT.